US009143571B2

(12) United States Patent
Kim et al.

(10) Patent No.: US 9,143,571 B2
(45) Date of Patent: Sep. 22, 2015

(54) METHOD AND APPARATUS FOR IDENTIFYING MOBILE DEVICES IN SIMILAR SOUND ENVIRONMENT

(75) Inventors: Taesu Kim, Seoul (KR); Te-Won Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 13/370,668

(22) Filed: Feb. 10, 2012

(65) Prior Publication Data

US 2012/0224707 A1     Sep. 6, 2012

Related U.S. Application Data

(60) Provisional application No. 61/449,451, filed on Mar. 4, 2011.

(51) Int. Cl.
| | | |
|---|---|---|
| *G06F 17/00* | (2006.01) | |
| *H04L 29/08* | (2006.01) | |
| *H04W 4/02* | (2009.01) | |
| *H04W 4/20* | (2009.01) | |

(Continued)

(52) U.S. Cl.
CPC .............. *H04L 67/18* (2013.01); *H04W 4/023* (2013.01); *H04W 4/043* (2013.01); *H04W 4/08* (2013.01); *H04W 4/206* (2013.01)

(58) Field of Classification Search
CPC .................... G06F 17/30743; G06F 17/30017; G06Q 30/02; H04H 20/14; H04H 2201/90; H04H 60/37; H04H 60/45; H04H 60/58
See application file for complete search history.

(56) References Cited

U.S. PATENT DOCUMENTS

| | | |
|---|---|---|
| 5,918,223 A | 6/1999 | Blum et al. |
| 6,127,975 A | 10/2000 | Maloney |
| 6,912,178 B2 | 6/2005 | Chu et al. |

(Continued)

FOREIGN PATENT DOCUMENTS

| | | |
|---|---|---|
| CN | 1573725 A | 2/2005 |
| CN | 101874397 A | 10/2010 |

(Continued)

OTHER PUBLICATIONS

Azizyan, et al., "SurroundSense: Localizing Mobile Phones Using Ambient Light, Sound, Color, and Motion", Duke University, 15 pages, printed Feb. 8, 2012.

(Continued)

*Primary Examiner* — Andrew C Flanders
(74) *Attorney, Agent, or Firm* — Toler Law Group, PC

(57) ABSTRACT

A method for identifying mobile devices in a similar sound environment is disclosed. Each of at least two mobile devices captures an input sound and extracts a sound signature from the input sound. Further, the mobile device extracts a sound feature from the input sound and determines a reliability value based on the sound feature. The reliability value may refer to a probability of a normal sound class given the sound feature. A server receives a packet including the sound signatures and reliability values from the mobile devices. A similarity value between sound signatures from a pair of the mobile devices is determined based on corresponding reliability values from the pair of mobile devices. Specifically, the sound signatures are weighted by the corresponding reliability values. The server identifies mobile devices in a similar sound environment based on the similarity values.

33 Claims, 10 Drawing Sheets

(51) Int. Cl.
*H04W 4/04* (2009.01)
*H04W 4/08* (2009.01)

(56) References Cited

U.S. PATENT DOCUMENTS

| | | | |
|---|---|---|---|
| 7,171,329 | B2 | 1/2007 | Rodman et al. |
| 7,305,078 | B2 | 12/2007 | Kardos |
| 7,617,287 | B2 | 11/2009 | Vella et al. |
| 7,675,414 | B2 | 3/2010 | Ray |
| 7,746,226 | B2 | 6/2010 | Cohen et al. |
| 2001/0022558 | A1 | 9/2001 | Karr, Jr. et al. |
| 2004/0259536 | A1 | 12/2004 | Keskar et al. |
| 2005/0076081 | A1 | 4/2005 | Rui et al. |
| 2005/0091275 | A1* | 4/2005 | Burges et al. ............ 707/104.1 |
| 2006/0046707 | A1 | 3/2006 | Malamud et al. |
| 2006/0063539 | A1 | 3/2006 | Beyer, Jr. et al. |
| 2007/0037583 | A1 | 2/2007 | Kim et al. |
| 2007/0130580 | A1 | 6/2007 | Covell et al. |
| 2007/0172047 | A1 | 7/2007 | Coughlan et al. |
| 2007/0206759 | A1 | 9/2007 | Boyanovsky |
| 2008/0059177 | A1 | 3/2008 | Poirier et al. |
| 2008/0147461 | A1 | 6/2008 | Lee et al. |
| 2008/0160976 | A1 | 7/2008 | Virolainen et al. |
| 2008/0160977 | A1 | 7/2008 | Ahmaniemi et al. |
| 2008/0187143 | A1 | 8/2008 | Mak-Fan |
| 2008/0232568 | A1 | 9/2008 | Diethorn |
| 2008/0253547 | A1 | 10/2008 | Berndt et al. |
| 2009/0086949 | A1 | 4/2009 | Caspi et al. |
| 2009/0112589 | A1 | 4/2009 | Hiselius et al. |
| 2009/0157613 | A1 | 6/2009 | Strohmenger et al. |
| 2009/0176505 | A1 | 7/2009 | Van Deventer et al. |
| 2010/0040217 | A1 | 2/2010 | Aberg et al. |
| 2010/0112991 | A1 | 5/2010 | Hannaby |
| 2010/0120465 | A1 | 5/2010 | Chung |
| 2010/0205174 | A1 | 8/2010 | Jiang et al. |
| 2010/0216490 | A1 | 8/2010 | Linden |
| 2010/0316232 | A1 | 12/2010 | Acero et al. |
| 2010/0332668 | A1 | 12/2010 | Shah et al. |
| 2011/0294515 | A1 | 12/2011 | Chen et al. |
| 2012/0083286 | A1 | 4/2012 | Kim et al. |
| 2012/0131186 | A1 | 5/2012 | Klos et al. |
| 2012/0142324 | A1 | 6/2012 | Kim et al. |
| 2012/0142378 | A1 | 6/2012 | Kim et al. |

FOREIGN PATENT DOCUMENTS

| | | |
|---|---|---|
| EP | 1531478 A1 | 5/2005 |
| EP | 2317729 | 5/2011 |
| GB | 2445436 A | 7/2008 |
| JP | H10126755 A | 5/1998 |
| JP | H10257204 A | 9/1998 |
| JP | 2001016214 A | 1/2001 |
| JP | 2002027529 A | 1/2002 |
| JP | 2003067316 A | 3/2003 |
| JP | 2003259409 A | 9/2003 |
| JP | 2004286681 A | 10/2004 |
| JP | 2005070921 A | 3/2005 |
| JP | 2005173569 A | 6/2005 |
| JP | 2006208482 A | 8/2006 |
| JP | 2006229356 A | 8/2006 |
| JP | 2007060254 A | 3/2007 |
| JP | 2009239431 A | 10/2009 |
| JP | 2010154261 A | 7/2010 |
| WO | WO0248837 | 6/2002 |
| WO | 2009042105 A1 | 4/2009 |
| WO | 2010134817 A2 | 11/2010 |
| WO | WO2010125488 A2 | 11/2010 |

OTHER PUBLICATIONS

Azizyan, Martin, et al., "SurroundSense: Mobile Phone Localization via Ambience Fingerprinting", MobiCom'09, Sep. 20-25, 2009, Beijing, China, 12 pages.

Hong Lu et al., "SoundSense: Scalable Sound Sensing for People-Centric Applications on Mobile Phones", MobiSys'09, Jun. 22-25, 2009, Kraków, Poland, pp. 165-178.

Janson, et al., "Self-localization application for iPhone using only ambient sound signals", Dept. Of Comput. Sci., Univ. of Freiburg, Freiburg, Germany. This paper appears in: Indoor Positioning and Indoor Navigation (IPIN), 2010 International Conference on Sep. 15-17, 2010, Zurich, 2pages.

Martin Wirz, et al., "A wearable, ambient sound-based approach for infrastructureless fuzzy proximity estimation", in Proceedings of the 14th IEEE International Symposium on Wearable Computers (ISWC 2010). IEEE Computer Society, Oct. 2010.

International Preliminary Report on Patentability for International Application No. PCT/US2012/025464 mailed Jun. 12, 2013, 34 pp.

Azizyan et al., "SurroundSense: Mobile Phone Localization Using Ambient Sound and Light", ACM Sigmobile Mobile Computing and Communications Review, Jan. 1, 2009, pp. 69-72, vol. 13, No. 1.

International Search Report and Written Opinion—PCT/US2012/025464—ISA/EPO—May 24, 2012 (110916WO).

Jain et al., "Data Clustering: A Review ", ACM Computing Surveys, Sep. 1999, pp. 264-323, vol. 31, No. 3.

Written Opinion of the International Preliminary Examining Authority for International application No. PCT/US2012/025464 mailed Feb. 22, 2013; 5 pages.

Sakurauchi Y., et al., "An Information Exchange Platform by Utilizing the Overlay Location Network Based on User Similarity Considering on Place and Time," Journal of the Information Processing Society of Japan, vol. 50, No. 12 [CD-ROM], Dec. 15, 2009, 16 Pages.

* cited by examiner

METHOD AND APPARATUS FOR IDENTIFYING MOBILE DEVICES IN SIMILAR SOUND ENVIRONMENT

CROSS-REFERENCE TO RELATED APPLICATIONS

This application is based upon and claims the benefit of priority from U.S. Provisional Patent Application No. 61/449,451, filed on Mar. 4, 2011, the entire contents of which are incorporated herein by reference.

TECHNICAL FIELD

The present disclosure relates generally to identifying mobile devices in a similar sound environment. More specifically, the present disclosure relates to identifying mobile devices in a similar sound environment based on input sounds of the mobile devices.

BACKGROUND

Modern mobile communication systems provide a variety of services to mobile device users. Such systems often provide advertising and social network services based on location information of the mobile device users. Location information of a user's mobile device may allow a service provider to infer a user's environment and offer more targeted advertising and social network services to the user. In addition, location information of mobile devices in nearby locations or similar types of locations may allow the service provider to provide information on users located in similar environments.

One of the conventional methods determines the locations of mobile devices by using GPS (Global Positioning System). Unfortunately, GPS is often unavailable in many locations where mobile devices are used. For example, when the mobile devices are located in buildings or indoor situations, location information through GPS may not be available. In addition, GPS may not accurately distinguish between users in different vertical locations such as a user on one floor and another user on another floor.

Another conventional method determines locations of mobile devices by sensing ambient sounds of the mobile devices. Unfortunately, such a method may not be accurate in determining the locations or types of locations of the mobile devices due to artifacts. For example, when a user touches, taps, or even softly rubs his or her mobile device, the mobile device typically captures an artifact sound signal associated with such an activity. In addition, when a mobile device is in a pocket or bag of the user, the microphone of the mobile device may capture artifact noises.

Such artifacts are generally unique to an individual mobile device and are not detected by other mobile devices. As a result, the artifacts may prevent accurate identification of mobile devices in a similar sound environment and degrade the accuracy in determining the location information of the mobile devices.

SUMMARY

The present disclosure provides methods and apparatuses for identifying mobile devices in a similar sound environment. The mobile devices are identified based on sound signatures extracted from input sounds of the mobile devices and degrees of reliability for ensuring that the respective input sounds are normal sounds, and not artifacts.

According to one aspect of the present disclosure, a method for identifying mobile devices in a similar sound environment is disclosed. The method includes receiving, in a mobile device, an input sound. The mobile device extracts a sound signature from the input sound and determines a reliability value of the input sound based on at least one predetermined sound model. The sound signature and the reliability value are transmitted from the mobile device to a server. The mobile device receives, from the server, information on at least one mobile device in a sound environment similar to the mobile device. This disclosure also describes an apparatus, a combination of means, and a computer-readable medium relating to this method.

According to another aspect of the present disclosure, a mobile device including a sound sensor, a sound signature extracting unit, and a reliability determining unit is provided. The sound sensor is configured to receive an input sound and the sound signature extracting unit is adapted to extract a sound signature from the input sound. A reliability value of the input sound is determined by the reliability determining unit based on at least one predetermined sound model. The sound signature and the reliability value are transmitted to a server by a transmitting unit of the mobile device. A receiving unit of the mobile device receives, from the server, information on at least one mobile device in a sound environment similar to the mobile device.

According to yet another aspect of the present disclosure, a method for identifying a plurality of mobile devices in a similar sound environment is disclosed. The method includes receiving, from each of at least two mobile devices, a sound signature and a reliability value of an input sound. A similarity value for a pair of the at least two mobile devices is determined based on the sound signatures and the reliability values from the pair of the at least two mobile devices. The method identifies, among the at least two mobile devices, the plurality of mobile devices in the similar sound environment based on the similarity value. This disclosure also describes an apparatus, a combination of means, and a computer-readable medium relating to this method.

According to yet another aspect of the present disclosure, a server for identifying a plurality of mobile devices in a similar sound environment is provided. The server includes a receiving unit configured to receive, from each of at least two mobile devices, a sound signature and a reliability value of an input sound. A similarity determining unit of the server is adapted to determine a similarity value for a pair of the at least two mobile devices based on the sound signatures and the reliability values from the pair of the at least two mobile devices so that, among the at least two mobile devices, the plurality of mobile devices in the similar sound environment are identified based on the similarity value.

DETAILED DESCRIPTION

Figure 1:
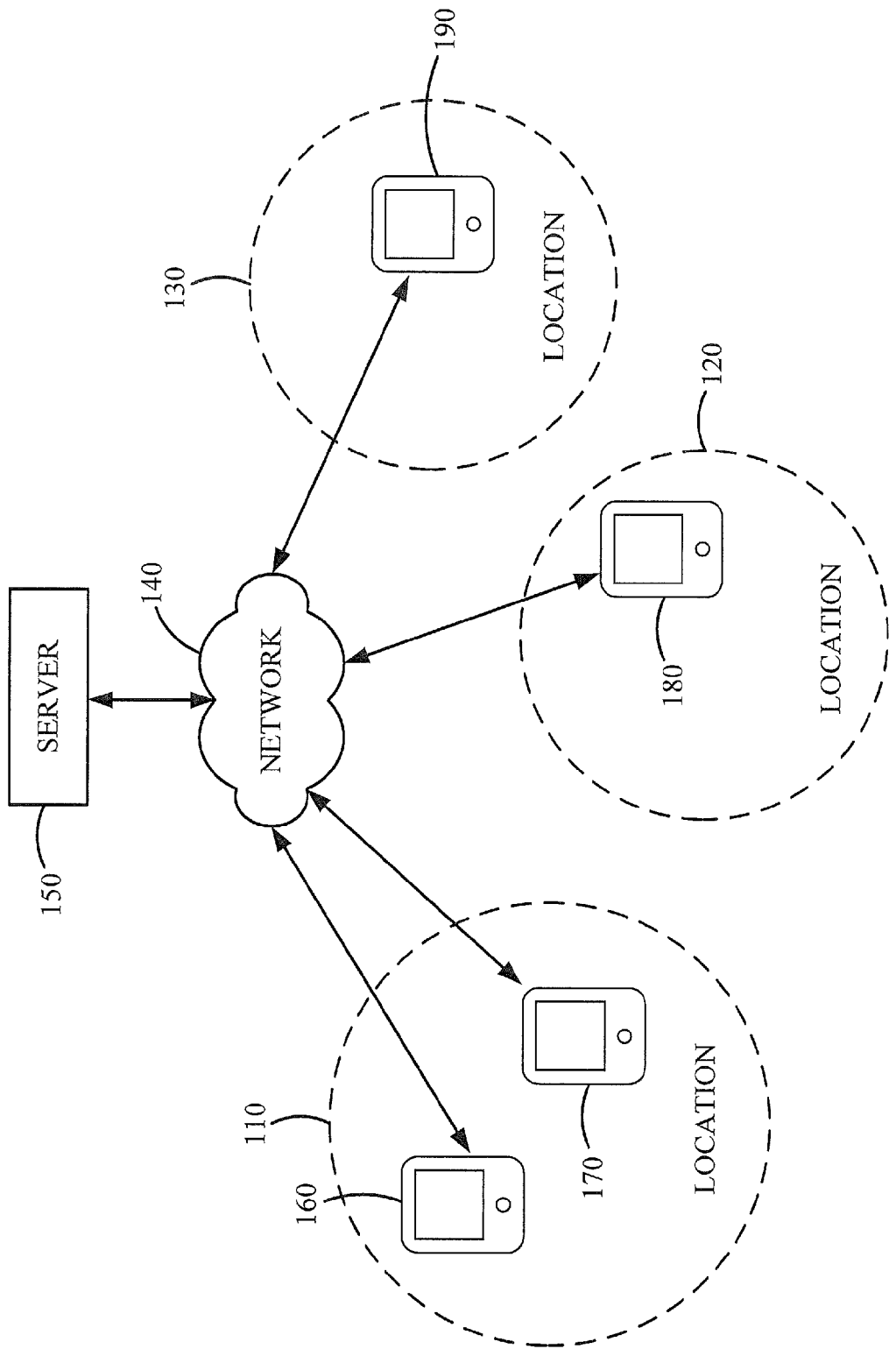
FIG. 1 illustrates a server and a plurality of mobile devices for identifying mobile devices in a similar sound environment according to one embodiment of the present disclosure.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

FIG. 1 illustrates a server 150 and a plurality of mobile devices 160, 170, 180, and 190 configured to identify mobile devices in a similar sound environment according to one embodiment of the present disclosure. The mobile devices 160, 170, 180, and 190, and the server 150 communicate with each other through a wireless network 140. The mobile devices 160 and 170 are located in a geographic location 110 indicating a sound environment. The location 110 may be a store, a theater, a conference room, a street, or the like, where the mobile devices 160 and 170 can capture sound from the surroundings. The mobile device 180 is located in another geographic location 120 indicating another sound environment where the sound in the location 120 is detected only by the mobile device 180. The mobile device 190 is located in yet another geographic location 130 indicating yet another sound environment.

In the illustrated embodiment, each of the mobile devices 160, 170, 180, and 190 captures an input sound from its surroundings. If the input sounds captured by mobile devices 160, 170, 180, and 190 are similar to each other, the mobile devices may be described as being in a similar sound environment. Each mobile device extracts a sound signature from the input sound and determines a reliability value of the input sound based on one or more predetermined sound models. Each mobile device then transmits the sound signature and the reliability value of the input sound to the server 150. The server 150 identifies mobile devices in a similar sound environment based on the sound signatures and reliability values, and transmits the identification information to the mobile devices 160, 170, 180, and 190.

The mobile devices 160, 170, 180, and 190 are presented only by way of example, and thus the number of mobile device(s) located in each location or the number of location(s) may vary for different configurations. In addition, the mobile devices 160, 170, 180, and 190 may be any suitable device such as a cellular phone, smartphone, laptop computer, or tablet personal computer equipped with sound capturing capability, e.g., a microphone, and communication capability through a data and/or communication network.

Figure 2:
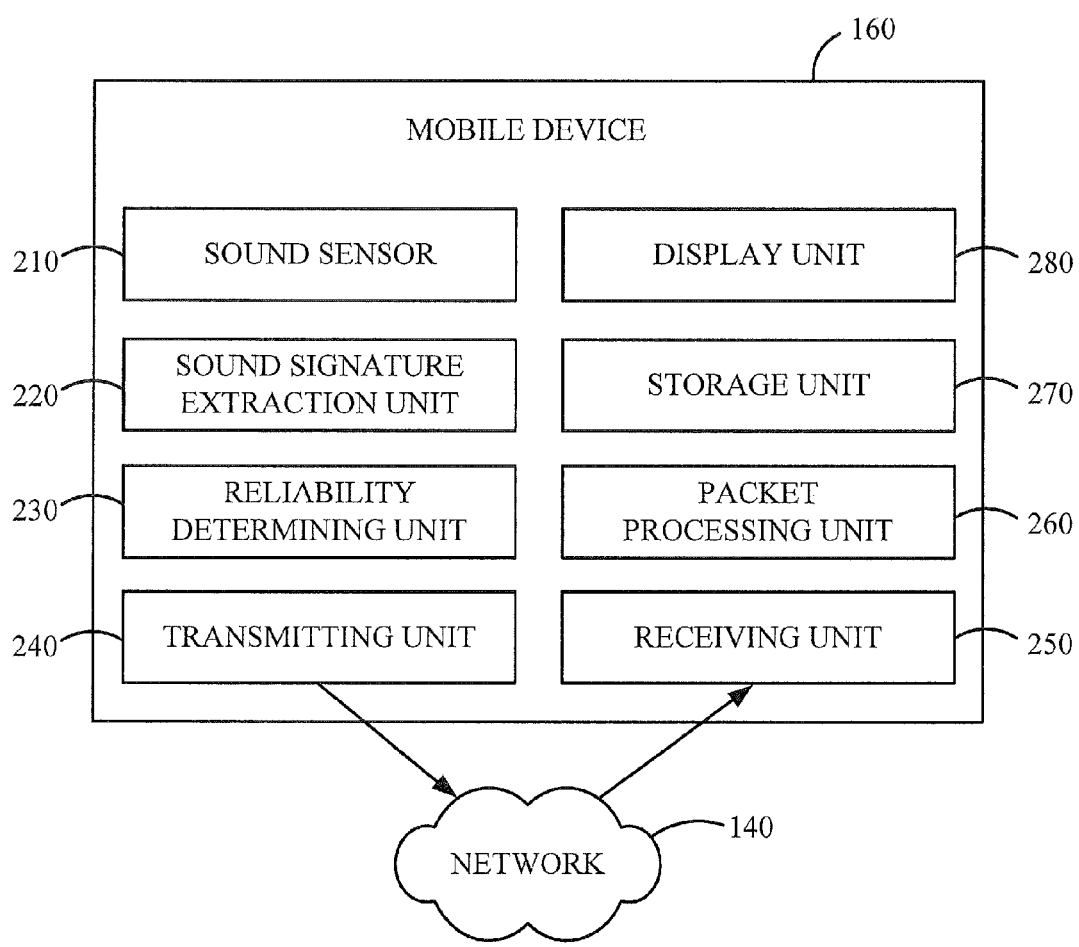
FIG. 2 shows an exemplary configuration of a mobile device according to one embodiment of the present disclosure.

FIG. 2 shows an exemplary configuration of the mobile device 160 according to one embodiment of the present disclosure. The mobile device 160 includes a sound sensor 210, a sound signature extraction unit 220, a reliability determining unit 230, a transmitting unit 240, a receiving unit 250, a packet processing unit 260, a storage unit 270, and a display unit 280. Although the mobile device 160 shown in FIG. 2 is illustrated with the above configuration, it may employ additional or alternative configurations without departing from the scope of the present disclosure. In addition, the mobile devices 170, 180, and 190 may also employ similar configurations. Further, the above described units and/or structures in the mobile device 160 may be implemented by hardware, software executed in one or more processors, and/or the combination thereof.

The sound sensor 210 (e.g., a microphone) is configured to sense and capture sound input to the mobile device 160 and to generate signals in an analog or digital format corresponding to the sensed sound. The sound signature extraction unit 220 extracts a sound characteristic of the input sound from the generated signals, which may be referred to as a "sound signature" in the present disclosure. The sound signature may include any type of sound characteristic that is used for determining whether the mobile device 160 is in a similar sound environment to other mobile devices. Such sound signature may be extracted using any suitable sound analysis techniques including, but not limited to, MFCC (mel-frequency cepstral coefficients), LPC (linear predictive coding), and/or LSP (line spectral pair) techniques, which will be described in more detail below. The reliability determining unit 230 determines a reliability value (e.g., a degree of reliability) of the sensed sound with reference to predetermined acoustic models. The packet processing unit 260 constructs a packet including the sound signature and the reliability value. The transmitting unit 240 transmits the packet to the server 150 to identify one or more mobile devices in a similar sound environment.

The server 150 is configured to send information on one or more mobile devices in a similar sound environment in the form of a packet. The receiving unit 250 receives from the server 150 the packet and forwards it to the packet processing unit 260, which processes the received packet to obtain the information on one or more mobile devices. The display unit 280 displays the information for providing services to a user of the mobile device 160. The storage unit 270 is configured to store information processed, transmitted, and/or received during the operation of the mobile device 160.

The sound sensor 210 may include, e.g., one or more microphones or any other type of sound sensors used to capture, measure, and/or record any aspect of normal sounds or artifacts. For example, the sound sensor 210 generates sound signals in response to artifacts such as clicking, tapping, or rubbing of the mobile device 160, vibrations of the mobile device 160, user's breathing, or the like, which are typically received by the sound sensor 210 as sound. Such "artifact sounds" are generally local to the mobile device 160 and are not detected by other mobile devices. On the other hand, "normal sounds" indicate sounds that are not local to the mobile device 160 and may be detectable by other mobile devices if located nearby. Such normal sounds may include environmental or ambient sounds such as television sounds, music sounds, public announcement sounds, traffic sounds, etc., as well as voices of a user.

Some embodiments of the present disclosure may take advantage of sound sensors built into the mobile device 160 such as a microphone used for a telephone call or video recording. In this case, the sound sensor 210 may be implemented without requiring any modification of the mobile device 160. Also, the sound sensor 210 may employ additional software and/or hardware to perform its functions in the mobile device 160.

For sound processing, the sound signature extraction unit 220 may use any suitable signal processing scheme, including speech compression, enhancement, recognition, and synthesis methods to extract sound signatures of input sounds. For example, such signal processing scheme may employ MFCC, LPC, and/or LSP techniques, which are well-known methods for speech recognition or speech codec.

In one embodiment, a sound signature may include multiple components, which are represented as a vector having n-dimensional values. Under the MFCC method, for example, a sound signature may include 13 dimensions with each dimension represented as a 16 bit value. In this case, the sound signature is 26 bytes long. In another embodiment, the sound signature may be binarized so that each dimension is represented as a 1 bit binary value. In such a case, the binarized sound signature may be 13 bits long.

A sound signature may be extracted from an input sound under the MFCC method as follows. A windowing function, e.g., hamming window, is applied to a frame of an input sound in the time domain (e.g., raw sound signal). Thereafter, the sound signal is Fourier transformed to the frequency domain, and a power is calculated for each band in the spectrum of the transformed signal in the frequency domain. A logarithm operation and a discrete cosine transform (DCT) operation are performed on each calculated power to obtain DCT coefficients. A mean value over a period of a predetermined time is subtracted from each DCT coefficient. Then, a binarization operation is performed on each subtracted DCT coefficient so that, if a subtracted DCT coefficient is positive, a binary value "1" is outputted; otherwise, a binary value "0" is outputted.

Figure 3:
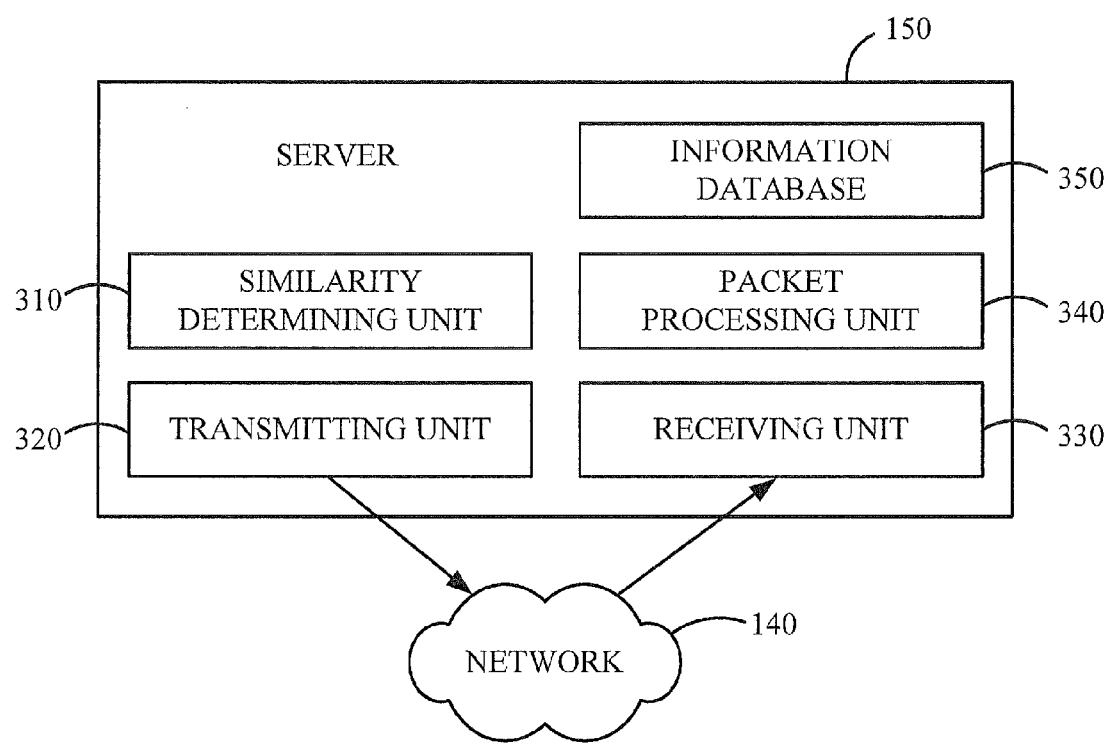
FIG. 3 shows an exemplary configuration of a server according to one embodiment of the present disclosure.

FIG. 3 shows an exemplary configuration of the server 150 according to one embodiment of the present disclosure. As shown in FIG. 3, the server 150 includes a similarity determining unit 310, a transmitting unit 320, a receiving unit 330, a packet processing unit 340, and an information database 350. The server 150 may be implemented by a conventional computer system executing the methods of the present disclosure with communication capability over the network 140. The server 150 may be used in a system for providing cloud computing services to the mobile devices 160, 170, 180, and 190 and other client devices. Further, one of the mobile devices 160, 170, 180, and 190 may be configured to function as the server 150 when the mobile devices communicate directly with each other, for example, using Wi-Fi Direct, Bluetooth, or FlashLinq technology, i.e., without an additional external server. The above described units in the server 150 may be implemented by hardware, software executed in one or more processors, and/or the combination thereof.

The receiving unit 330 is configured to receive, from each of the mobile devices 160, 170, 180, and 190, a packet containing a sound signature of an input sound and a reliability value of the input sound. The packet processing unit 340 receives the packets and extracts the sound signatures and reliability values. Based on the reliability values from the mobile devices 160, 170, 180, and 190, the similarity determining unit 310 determines similarity values between the sound signatures and identifies mobile devices in a similar sound environment based on the similarity values. The packet processing unit 340 constructs a packet containing information on the mobile devices in the similar sound environment. The transmitting unit 320 transmits the constructed packet to the mobile devices 160, 170, 180, and 190. The server 150 uses the information database 350 to store information processed, transmitted, and/or received during the above operations.

Figure 4:
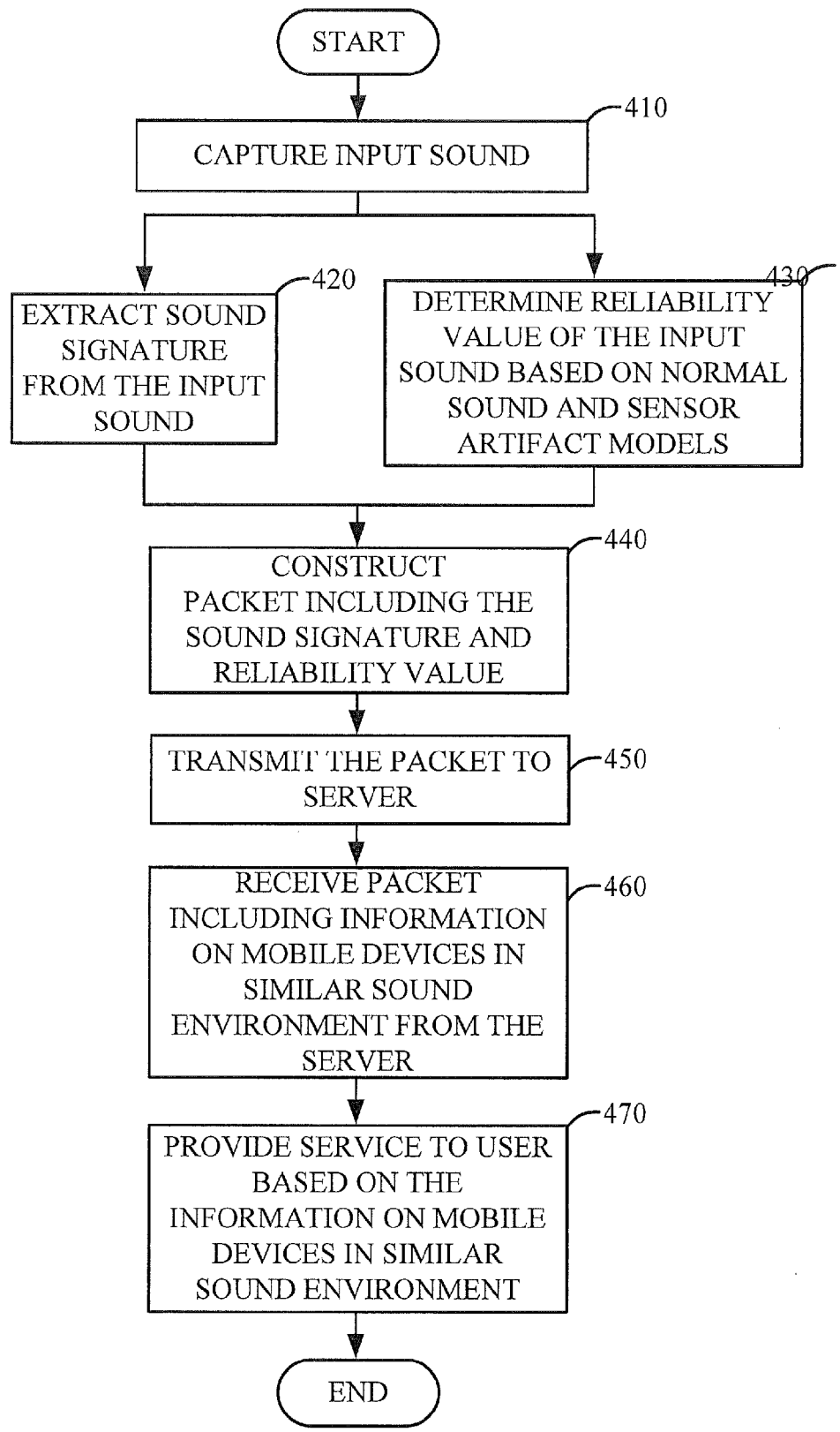
FIG. 4 illustrates a flowchart of a method, performed by a mobile device, for identifying mobile devices in a similar sound environment according to one embodiment of the present disclosure.

FIG. 4 illustrates a flowchart of a method, performed by the mobile device 160, for identifying mobile devices in a similar sound environment according to one embodiment of the present disclosure. At 410, the mobile device 160 captures input sound through the sound sensor 210 and outputs a signal corresponding to the captured input sound. The input sound includes normal sound and may also include artifacts, e.g., tapping or friction noise, that are local to the mobile device 160. At 420, the sound signature extraction unit 220 extracts and outputs a sound signature from the input sound, in a manner described above with reference to FIG. 2.

At 430, the reliability determining unit 230 determines a reliability value of the input sound based on a normal sound model and one or more sensor artifact models. A sensor artifact model refers to an acoustic model indicative of an artifact local to a mobile device. The reliability value indicates a confidence level of the input sound in classifying the sound as belonging to the normal sound class. As a part of the process of determining the reliability value, the reliability determining unit 230 extracts a sound characteristic from the input sound, which may be referred to as a "sound feature" in the present disclosure. Compared with the sound signature, the sound feature contains any type of sound characteristic or information that is used for analyzing and classifying the input sound into predetermined sound classes such as a normal sound class and one or more artifact classes. Acoustic models of the predetermined sound classes, i.e., the normal sound model and one or more sensor artifact models, are also generated and stored in advance. The operation of extracting the sound signature, at 420, may be performed prior, subsequent, or parallel to the operation of determining the reliability value, at 430.

In one embodiment, the sound feature can be extracted by any suitable sound analysis techniques including, but not limited to, MFCC, LPC, and/or LSP techniques, similar to the extraction of the sound signature. In an alternative embodiment, the sound feature may include information on the count of clipped samples in the input sound, which is captured during a specific time period. The sound samples in the input sound, such as sensor artifacts captured while the mobile device 160 is clicked, tapped, or rubbed, are more frequently clipped than sound samples of normal sounds. Accordingly, the input sound may be classified as belonging to the sensor artifact class if the count of clipped samples therein exceeds a predetermined threshold value, and otherwise classified as belonging to the normal sound class. In another embodiment, the distribution of frequency components in the input sound may be used for classifying the input sound as belonging to the sensor artifact class or the normal sound class. For example, the count or amplitude of frequency components of 50 Hz or less may be greater for sensor artifact sounds than normal sounds. Accordingly, the sound feature may include information on the count or amplitude of frequency components of the input sound falling within a specific frequency range.

In one embodiment of the present disclosure, in order to generate the acoustic models, a variety of normal sound and artifact conditions are trained through a modeling method like a GMM (Gaussian Mixture Model) method or HMM (Hidden Markov Model) method. Given the extracted sound feature, the reliability value may be determined based on a probability P of a normal sound that is obtained by the following Equation 1:

$$P(\lambda_s \mid X) = \frac{P(X \mid \lambda_s)P(\lambda_s)}{P(X)} = \frac{P(X \mid \lambda_s)P(\lambda_s)}{\sum_j P(\lambda_j)P(X \mid \lambda_j)} \quad \text{(Eq. 1)}$$

where X denotes the sound feature, $\lambda_s$ is the normal sound class, and $\lambda_j$ is a j-th sound class of the predetermined sound classes including the normal sound class and the sensor artifact classes. The index j ranges from 1 to n, where n indicates the number of the predetermined sound classes.

In one embodiment of the present disclosure, two or more normal sound classes are predetermined and corresponding normal sound models are generated. Given the extracted sound feature, the probability P that the input sound belongs to the normal sound classes may be determined by summing the probabilities of the normal sound classes according to the following Equation 2:

$$P = \sum_i P(\lambda_i \mid X) = \sum_i \frac{P(X \mid \lambda_i)P(\lambda_i)}{P(X)} = \sum_s \frac{P(X \mid \lambda_i)P(\lambda_i)}{\sum_j P(\lambda_j)P(X \mid \lambda_j)} \quad \text{(Eq. 2)}$$

where $\lambda_i$ is an i-th sound class of the normal sound classes. The index i ranges from 1 to m, where m indicates the number of the normal sound classes.

Once the probability P has been determined, the reliability value may be represented as the value of the probability P (0≤P≤1). The reliability value may be a value proportional to the value of the probability P, which may be log-scaled to indicate the reliability value. In one embodiment, the reliability may be binarized to have a binary value "1" when the probability P is greater than a predetermined probability threshold. Otherwise, the reliability may be binarized to have a binary value "0."

At 440, the packet processing unit 260 constructs a packet including the sound signature and the reliability value. If a plurality of input sounds is captured over a period of time, the packet is constructed to include a corresponding number of pairs of sound signatures and reliability values. At 450, the transmitting unit 240 transmits the packet to the server 150 through the network 140. Similar to the mobile device 160, a transmitting unit in each of the other mobile devices 170, 180, and 190 may also transmit a packet containing one or more pairs of sound signatures and reliability values.

Figure 5:
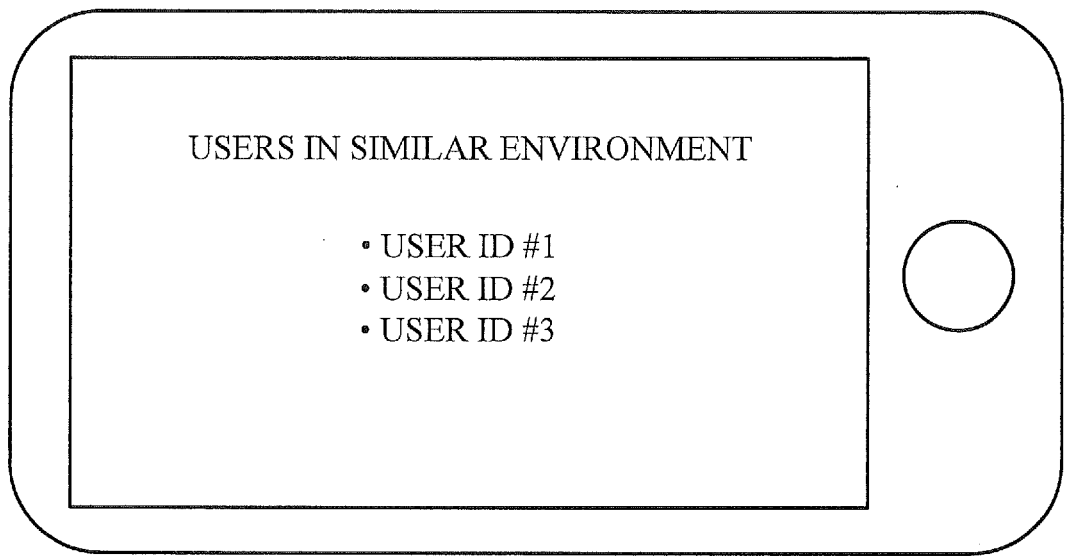
FIG. 5 illustrates a screenshot of mobile device users in a similar sound environment according to one embodiment of the present disclosure.

When the server 150 sends a packet including information on mobile devices in a similar sound environment, the mobile device 160 receives the packet, at 460, and displays the information for providing services to the user of the mobile device 160, at 470. For example, the services may include providing information relating to other mobile devices in a similar sound environment such as user identification information, allowing communication between such mobile devices, and providing targeted information to the mobile device 160 such as advertising information. FIG. 5 illustrates a screenshot of users of the mobile devices in a similar sound environment according to one embodiment of the present disclosure. As shown, the display unit 280 displays IDs of users of the mobile devices in a sound environment similar to the mobile device 160.

Figure 6:
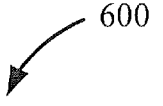
FIG. 6 shows a table illustrating a configuration of a packet including sound signatures and reliability values that is sent from a mobile device to a server according to one embodiment of the present disclosure.

FIG. 6 shows a table 600 illustrating a configuration of a packet including sound signatures and reliability values that is sent from the mobile device 160 to the server 150 according to one embodiment of the present disclosure. As shown in the table 600, the packet includes the packet fields listed on the right-hand column. The field names on the left-hand column are used for explanatory purposes and need not be included in the packet. In the packet format, the PACKET TYPE field is 4 bits in length and contains information indicating that the packet includes sound signatures and reliability values. The IDENTIFICATION field is 64 bits in length and contains identification information for the mobile device 160 (e.g., model number, product serial number) and/or its user (e.g., user name, user ID). Such identification information may be pre-stored in the storage unit 270. The TIME STAMP field is 64 bits in length and indicates a current time or a time when the input sound is captured, which may be monitored by a clock unit (not shown) of the mobile device 160.

The packet includes N sound signatures and N reliability values corresponding to N input sounds captured over a period of time. Reflecting the number N, the packet includes a SOUND SIGNATURE[i] field and a RELIABILITY[i] field for each pair of the sound signatures and reliability values. Specifically, the SOUND SIGNATURE[i] is 8 bits in length and contains a sound signature of an i-th pair of the sound signatures and reliability values. The RELIABILITY [i] field is 4 bits in length and includes a reliability value of the i-th pair. The number of bits allocated to each data field above may change according to various applications of the present disclosure. Further, the packet may include any fields of suitable sizes such as a header, CRC information, etc. to facilitate communication through the network 140.

In one embodiment, the packet 600 may further include a message field (not shown) for carrying a message from the mobile device 160 to other mobile devices in a similar sound environment. When the server 150 identifies the other mobile devices and transmits the message to the other mobile devices, the other mobile devices may show the message to the users. For example, the message may be a chat message, a targeted advertisement, an introduction profile of the user of the mobile device 160, or the like.

Figure 7:
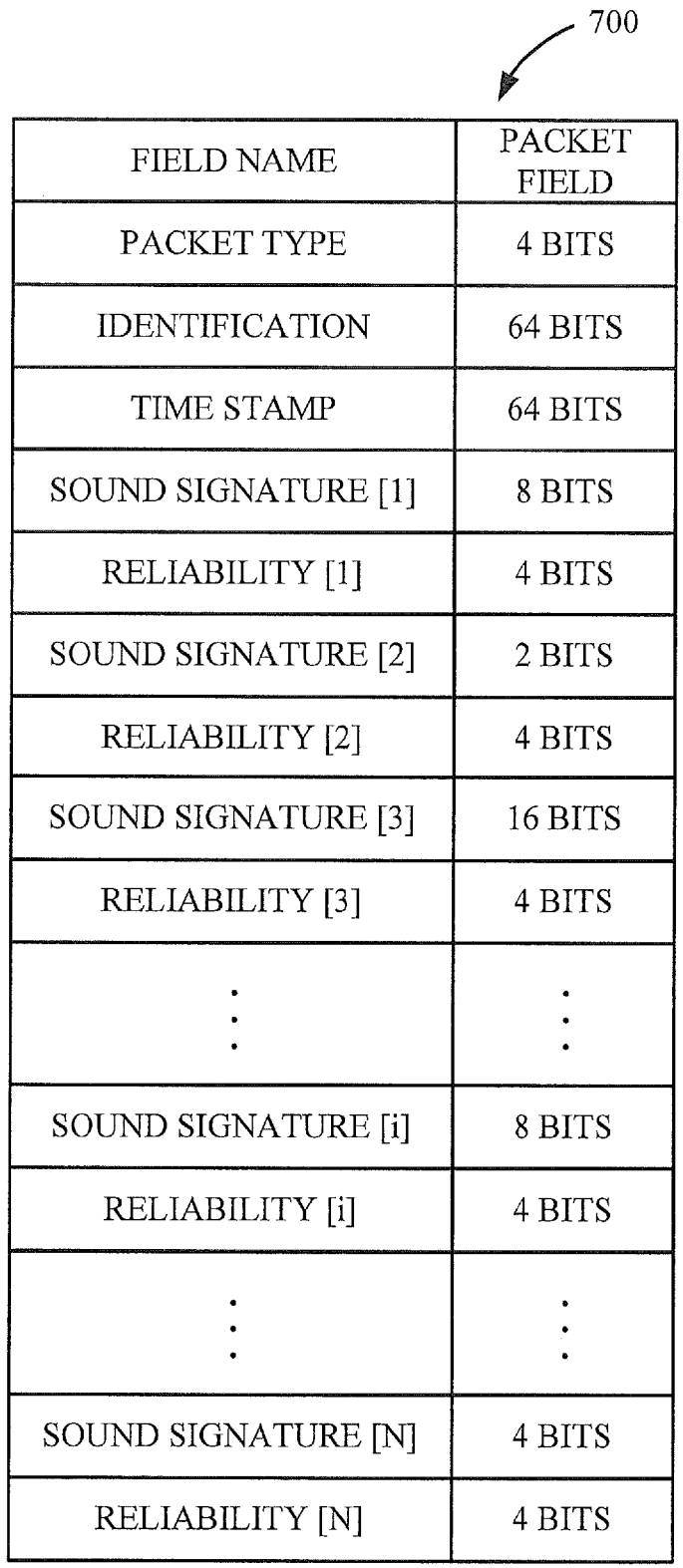
FIG. 7 shows a table illustrating another configuration of a packet including sound signatures and reliability values that is sent from a mobile device to a server according to one embodiment of the present disclosure.

FIG. 7 shows a table 700 illustrating another configuration of a packet including sound signatures and reliability values that is sent from the mobile device 160 to the server 150 according to one embodiment of the present disclosure. The packet represented by the table 700 includes the same fields such as a PACKET TYPE field, IDENTIFICATION field, TIME STAMP field, and RELIABILITY fields described in FIG. 6. In the table 700, the size of each SOUND SIGNATURE field is determined based on the reliability value of the corresponding RELIABILITY field such that the SOUND SIGNATURE fields can be allocated different numbers of bits as shown in FIG. 7.

For example, the number of bits allocated to a SOUND SIGNATURE field may be configured to be proportional to the associated reliability value or vice versa. The number of bits may be determined in a stepwise method based on a normalized reliability value ranging from 0 to 1 (inclusive), for example, as follows:
  2 bits are allocated when 0≤reliability value<0.1;
  4 bits are allocated when 0.1≤reliability value<0.3;
  8 bits are allocated when 0.3≤reliability value<0.6; and
  16 bits are allocated when 0.6≤reliability value≤1.0.
Allocating sound signature's field sizes allows more efficient use of the packet resources based on the associated reliability values. Thus, the transmission efficiency of the packet can be improved.

Figure 8:
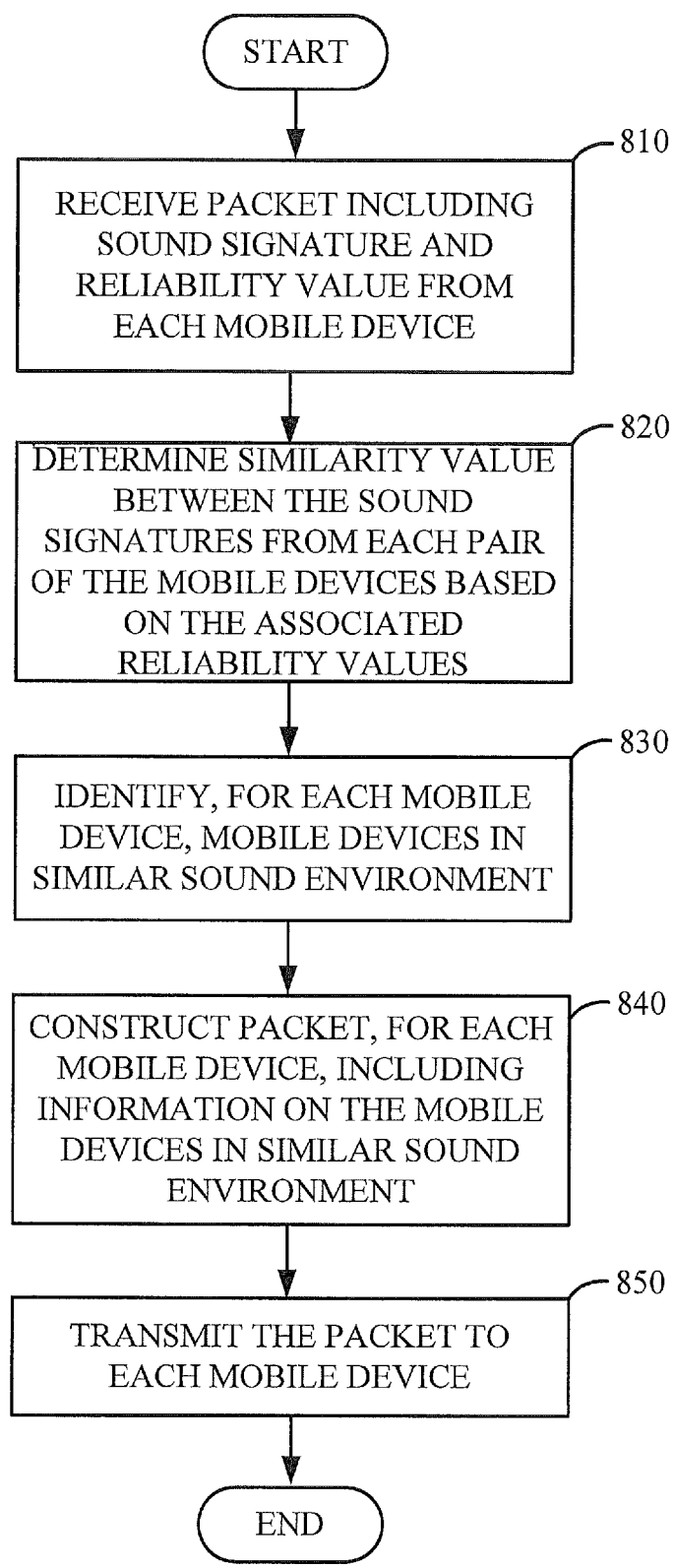
FIG. 8 depicts a flowchart of a method, performed by a server, for identifying mobile devices in a similar sound environment according to one embodiment of the present disclosure.

FIG. 8 depicts a flowchart of a method, performed by the server 150, for identifying mobile devices in a similar sound environment according to one embodiment of the present disclosure. At 810, the server 150 receives, at the receiving unit 330, a packet including a sound signature extracted from an input sound and a reliability value for the input sound from each of the mobile devices 160, 170, 180, and 190. At 820, the server 150 determines, in the similarity determining unit 310, a similarity value between sound signatures from each pair of the mobile devices 160, 170, 180, and 190 based on reliability values from the pair of the mobile devices 160, 170, 180, and 190.

At 830, the similarity determining unit 310 identifies, for each mobile device, mobile devices in a sound environment similar to the mobile device, based on the determined similarity values. With reference to FIG. 1, the mobile devices 160 and 170 are located in the same location 110 and capture similar input sounds. However, the mobile devices 180 and 190 are located apart from the other mobile devices and do not capture an input sound similar to the mobile devices 160 and 170. As a result, the mobile devices 160 and 170 are identified to be in a similar sound environment, while no mobile device is identified to be in a sound environment similar to the mobile device 180 or 190. In one embodiment, a similarity threshold may be used at 830 for identifying the mobile devices in a similar sound environment. The similarity threshold is a predetermined degree of similarity indicating a minimum similarity value to ensure a desired confidence level for the determination of mobile devices in a similar sound environment. With reference to FIG. 1, for example, the similarity threshold may be configured to a desired value below the similarity value between the sound signatures from the mobile devices 160 and 170 that are in a similar sound environment.

At 840, the packet processing unit 340 constructs a packet with an appropriate header for each mobile device. The packet includes information on mobile devices in a sound environment similar to the destination mobile device. The information may include identifications of the mobile devices and/or their users. At 850, the packet is transmitted by the transmitting unit 320 to each destination mobile device determined to have one or more mobile devices in a similar sound environment. In FIG. 1, for example, the server 150 will forward a packet to the mobile devices 160 and 170, but not to the mobile devices 180 and 190.

When determining a similarity value between sound signatures from a pair of mobile devices, at 820, the sound signatures may be weighted with corresponding reliability values. Typically, sound signatures extracted from artifacts will have low reliability values. In this weighting scheme, as the reliability values decrease, the contribution of the associated sound signatures to the similarity value is reduced. By weighting the contributions to account for reliability values for artifacts, the similarity value between sound signatures can be determined more accurately and reliably.

In some embodiments of the weighting scheme, the similarity value for a pair of mobile devices may be determined based on a sum of weighted Euclidean distances between pairs of vectors respectively indicating sound signatures from the mobile devices. In one embodiment, the sum of weighted Euclidean distances may be calculated by using pairs of sound signatures weighted with a smaller one of corresponding reliability values, according to following Equation 3:

$$\text{Sum of Weighted Euclidean Distances} = \frac{\sum_i \left( \min(r_a[i], r_b[i]) \sum_j |a[i, j] - b[i, j]|^2 \right)}{\sum_i \min(r_a[i], r_b[i])} \quad \text{(Eq. 3)}$$

where
$r_a[i]$ indicates an i-th reliability value from a first mobile device,
$r_b[i]$ indicates an i-th reliability value from a second mobile device,
$a[i, j]$ indicates a j-th dimension value of an i-th sound signature from the first mobile device, and
$b[i, j]$ indicates a j-th dimension value of an i-th sound signature from the second mobile device.

In the numerator of Equation 3, the smaller one of $r_a[i]$ and $r_b[i]$ serves as a weighting factor for the i-th sound signatures from the pair of mobile devices. That is, the smaller reliability value between $r_a[i]$ and $r_b[i]$ is used as a weighting factor for the Euclidean distance between the vectors respectively indicating the i-th sound signatures.

Once the sum of weighted Euclidean distances is calculated, the similarity value for the pair of mobile devices can be determined to be inversely proportional to the sum. In this case, when the sum of weighted Euclidean distances is smaller, the similarity value is determined to be larger. For example, the similarity value may be determined to be a reciprocal of the sum of weighted Euclidean distances or a value obtained by modifying the sum by a monotonic decreasing function or the like.

In another embodiment of the present disclosure, the sum of weighted Euclidean distances may be calculated by using sound signatures weighted with both of the corresponding reliability values, according to following Equation 4:

$$\text{Sum of Weighted Euclidean Distances} = \frac{\sum_i \left( r_a[i] r_b[i] \sum_j |a[i, j] - b[i, j]|^2 \right)}{\sum_i r_a[i] r_b[i]} \quad \text{(Eq. 4)}$$

The terms in Equation 4 are the same as those in Equation 3 above. In the numerator of Equation 4, both $r_a[i]$ and $r_b[i]$ serve as weighting factors for the i-th sound signatures from the pair of mobile devices.

In yet another embodiment, the similarity value for a pair of mobile devices is determined based on the smaller of two sums of weighted Euclidean distances: a first sum of weighted Euclidean distances calculated by using sound signatures weighted with reliability values from a first mobile device and a second sum of weighted Euclidean distances calculated by using sound signatures weighted with reliability values from a second mobile device. The first and second sums of weighted Euclidean distances are calculated according to following Equations 5 and 6, respectively:

$$\text{First Sum of Weighted Euclidean Distances} = \frac{\sum_i \left( r_a[i] \sum_j |a[i, j] - b[i, j]|^2 \right)}{\sum_i r_a} \quad \text{(Eq. 5)}$$

The terms in Equations 5 and 6 are the same as those in Equation 3 above. In the numerator of Equation 5, the reliability value $r_a[i]$ from the first mobile device serves as a weighting factor for the i-th sound signatures from the pair of mobile devices. Similarly, in the numerator of Equation 6, the reliability value $r_b[i]$ from the second mobile device is used as a weighting factor for the i-th sound signatures from the pair of mobile devices.

Figure 9:
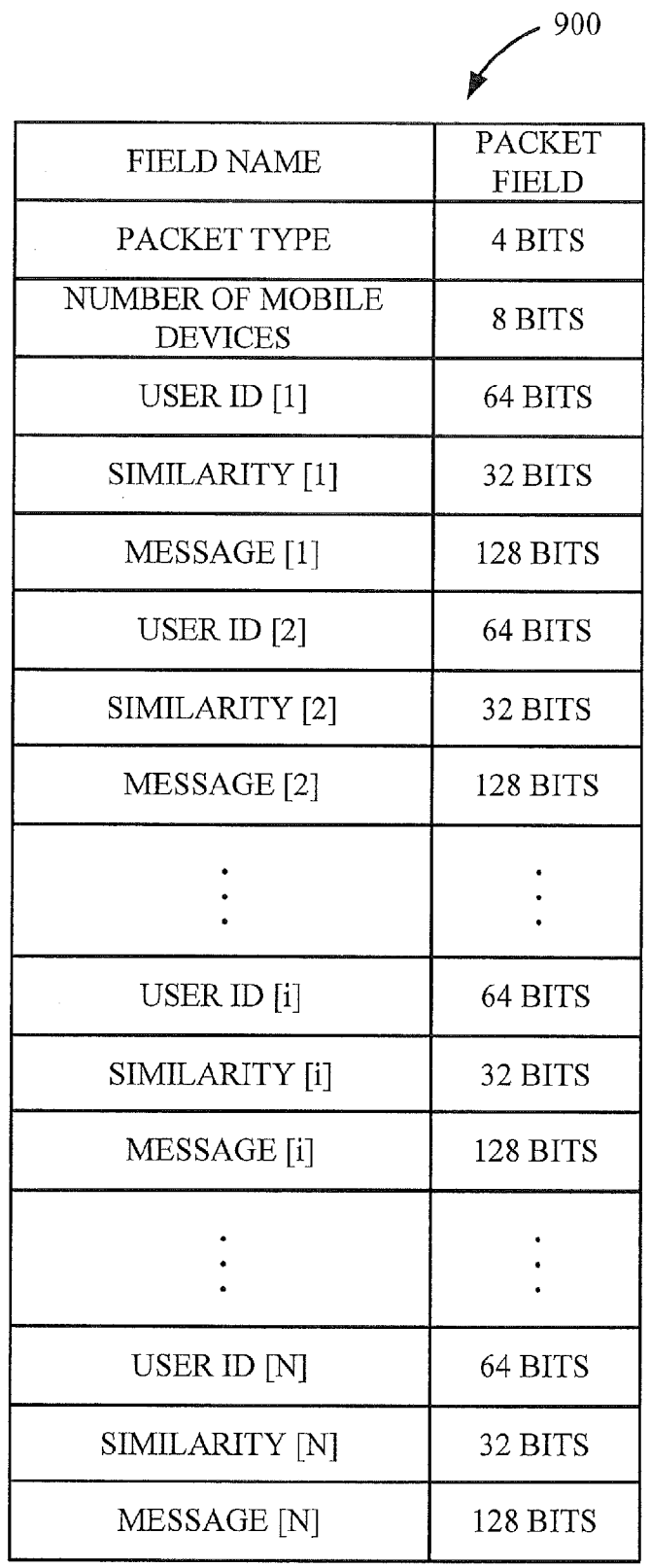
FIG. 9 shows a table illustrating a configuration of a packet including information on mobile devices in a similar sound environment that is sent from a server to a mobile device according to one embodiment of the present disclosure.

FIG. 9 shows a table 900 illustrating a configuration of a packet including information on mobile devices in a similar sound environment that is sent from the server 150 to the mobile device 160 according to one embodiment of the present disclosure. The packet represented by the table 900 contains a PACKET TYPE field and a MOBILE DEVICES NUMBER field. The PACKET TYPE field is 4 bits in length and contains information indicating that the packet contains information on one or more mobile devices in a sound environment similar to a destination mobile device. If N mobile devices are identified to be in a similar sound environment, the MOBILE DEVICES NUMBER of 8 bits in length indicates the number N.

Reflecting the number N, the packet further includes a USER ID[i] field, SIMILARITY[i] field, and MESSAGE[i] field for the N mobile devices. Specifically, the USER ID[i] field is 64 bits in length and includes user identification information (e.g., user name, user ID) of an i-th mobile device among the N mobile devices. The SIMILARITY[i] field is 32 bits in length and indicates a similarity value between sound signatures from the i-th mobile device and the destination mobile device. The MESSAGE[i] field is 128 bits in length and contains a message received from the i-th mobile device. The number of bits allocated to each type of data field above may change according to various applications of the present disclosure. Further, the packet may include any fields of suitable sizes such as a header, CRC information, etc. to facilitate communication through the network 140. In the above packet represented by the table 900, the SIMILARITY fields and/or the MESSAGE fields may be optional.

Figure 10:
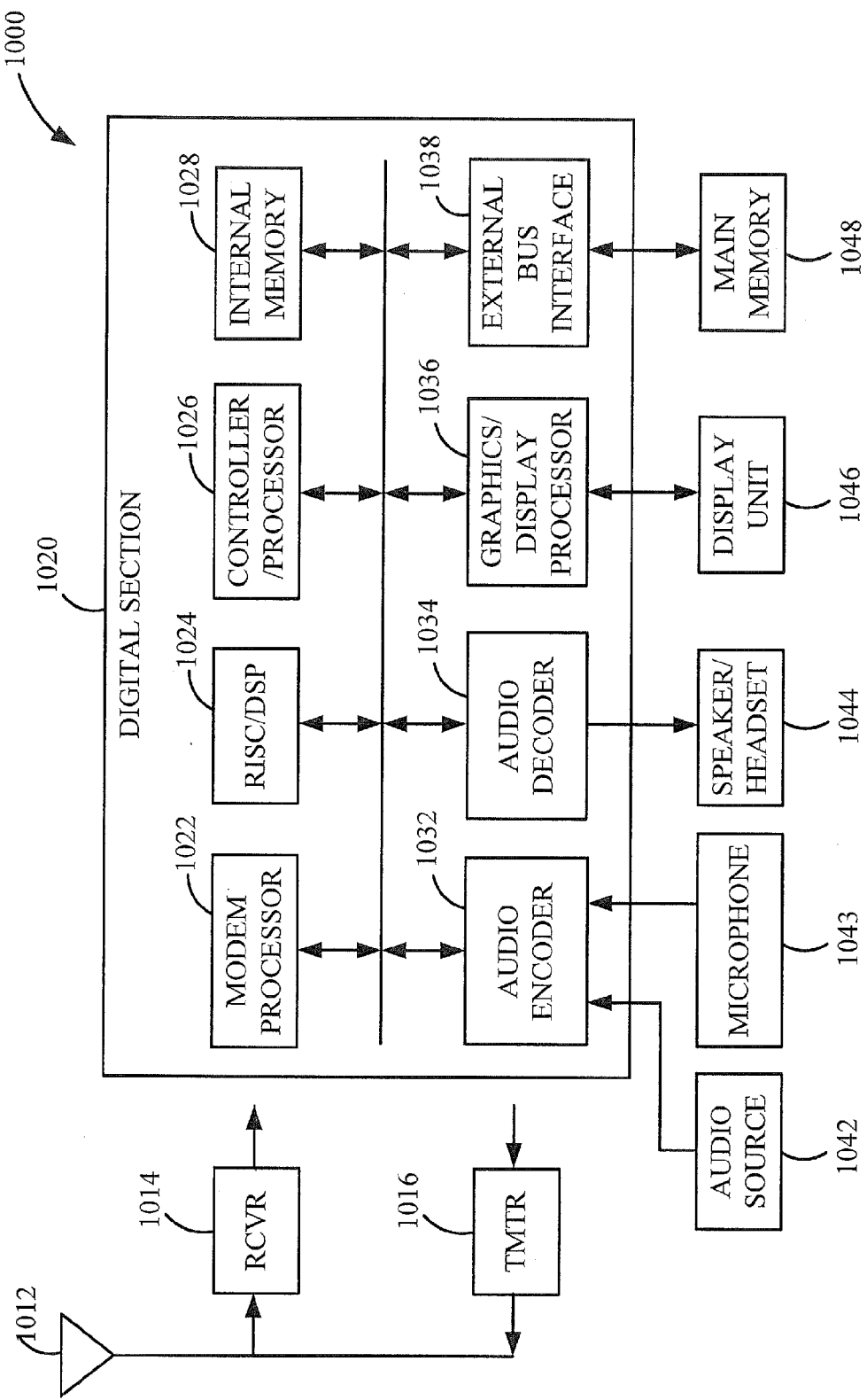
FIG. 10 illustrates a block diagram of an exemplary mobile device in a wireless communication system according to one embodiment of the present disclosure.

FIG. 10 is a block diagram of an exemplary mobile device 1000 in a wireless communication system according to one embodiment of the present disclosure. The configuration of the mobile device 1000 may be implemented in the mobile device 160, 170, 180, or 190. The mobile device 1000 may be a cellular phone, a terminal, a handset, a personal digital assistant (PDA), a wireless modem, a cordless phone, etc. The wireless communication system may be a Code Division Multiple Access (CDMA) system, a Global System for Mobile Communications (GSM) system, a Wideband CDMA (W-CDMA) system, a Long Term Evolution (LTE) system, a LTE Advanced system, etc. Further, the mobile device 1000 may communicate directly with another mobile device, for example, using Wi-Fi Direct, Bluetooth, or FlashLinq technology.

The mobile device 1000 is capable of providing bidirectional communication via a receive path and a transmit path. On the receive path, signals transmitted by base stations are received by an antenna 1012 and are provided to a receiver (RCVR) 1014. The receiver 1014 conditions and digitizes the received signal and provides the conditioned and digitized signal to a digital section 1020 for further processing. On the transmit path, a transmitter (TMTR) 1016 receives data to be transmitted from a digital section 1020, processes and conditions the data, and generates a modulated signal, which is transmitted via the antenna 1012 to the base stations. The receiver 1014 and the transmitter 1016 may be part of a transceiver that may support CDMA, GSM, W-CDMA, LTE, LTE Advanced, etc.

The digital section 1020 includes various processing, interface, and memory units such as a modem processor 1022, a reduced instruction set computer/digital signal processor (RISC/DSP) 1024, a controller/processor 1026, an internal memory 1028, a generalized audio encoder 1032, a generalized audio decoder 1034, a graphics/display processor 1036, and an external bus interface (EBI) 1038. The modem processor 1022 may process data transmission and reception, e.g., encoding, modulation, demodulation, and decoding. The RISC/DSP 1024 may perform general and specialized processing for the mobile device 1000. The controller/processor 1026 may control the operation of various processing and interface units within the digital section 1020. The internal memory 1028 may store data and/or instructions for various units within the digital section 1020.

The generalized audio encoder 1032 may perform encoding for input signals from an audio source 1042, a microphone 1043, etc. The generalized audio decoder 1034 may decode coded audio data and may provide output signals to a speaker/headset 1044. It should be noted that the generalized audio encoder 1032 and the generalized audio decoder 1034 are not necessarily required for interface with the audio source, the microphone 1043 and the speaker/headset 1044, and thus may be omitted in the mobile device 1000. The graphics/display processor 1036 may process graphics, videos, images, and texts, which may be presented to a display unit 1046. The EBI 1038 may facilitate transfer of data between the digital section 1020 and a main memory 1048.

The digital section 1020 may be implemented with one or more processors, DSPs, microprocessors, RISCs, etc. The digital section 1020 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosures herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For firmware and/or software implementations, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not as a limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying mobile devices in a similar sound environment, the method comprising:
   receiving, at a mobile device, an input sound from a first sound environment;
   extracting, at the mobile device, a sound signature from the input sound;
   determining, at the mobile device, a reliability value of the input sound, wherein the reliability value is determined based on at least one normal sound model and at least one sensor artifact model;
   transmitting the sound signature and the reliability value from the mobile device to a server; and
   receiving, from the server, information related to at least one mobile device in a second sound environment.

2. The method of claim 1, wherein determining the reliability value includes:
   determining a degree of reliability that the input sound belongs to a normal sound model rather than to a sensor artifact model.

3. The method of claim 2, wherein determining the reliability value further includes extracting a sound feature from the input sound.

4. The method of claim 1, further comprising constructing a packet including a sound signature field, wherein a number of bits of the sound signature field is determined based on the reliability value.

5. The method of claim 1, further comprising constructing a packet that includes a sound signature field indicative of the sound signature and a reliability field indicative of the reliability value, wherein constructing the packet includes determining a number of bits of the sound signature field based on the reliability value.

6. The method of claim 1, further comprising receiving, from the server, identification information of a user of the at least one mobile device, wherein the second sound environment is similar to the first sound environment.

7. A mobile device, comprising:
   a sound sensor configured to receive an input sound from a first sound environment;
   a sound signature extracting unit configured to extract a sound signature from the input sound;
   a reliability determining unit configured to determine a reliability value of the input sound, wherein the reliability value is determined based on at least one normal sound model and at least one sensor artifact model;
   a transmitting unit configured to transmit the sound signature and the reliability value to a server; and
   a receiving unit configured to receive, from the server, information related to at least one mobile device in a second sound environment.

8. The mobile device of claim 7, wherein the reliability determining unit is configured to:
   determine a degree of reliability that the input sound belongs to a normal sound model rather than to a sensor artifact model.

9. The mobile device of claim 8, wherein the reliability determining unit is configured to extract a sound feature from the input sound.

10. The mobile device of claim 7, further comprising a packet processing unit configured to construct a packet including a sound signature field, wherein a number of bits of the sound signature field is determined based on the reliability value, and wherein the transmitting unit is configured to transmit the packet to the server.

11. The mobile device of claim 7, further comprising a packet processing unit configured to construct a packet that includes a sound signature field indicative of the sound signature and a reliability field indicative of the reliability value, wherein the packet processing unit is configured to determine a number of bits of the sound signature field based on the reliability value.

12. The mobile device of claim 7, wherein the information includes identification information of a user of the at least one mobile device, and wherein the second sound environment is similar to the first sound environment.

13. A mobile device, comprising:
   means for receiving an input sound from a first sound environment;
   means for extracting a sound signature from the input sound;
   means for determining a reliability value of the input sound, wherein the reliability value is determined based on at least one normal sound model and at least one sensor artifact model;
   means for transmitting the sound signature and the reliability value to a server; and
   means for receiving, from the server, information related to at least one mobile device in a second sound environment.

14. The mobile device of claim 13, further comprising means for constructing a packet including a sound signature field, wherein a number of bits of the sound signature field is determined based on the reliability value, and wherein the means for transmitting is configured to transmit the packet to the server.

15. The mobile device of claim 13, further comprising means for constructing a packet that includes a sound signature field indicative of the sound signature and a reliability field indicative of the reliability value, wherein the means for constructing is configured to determine a number of bits of the sound signature field based on the reliability value, and wherein the second sound environment is similar to the first sound environment.

16. A non-transitory computer-readable storage medium comprising instructions for identifying mobile devices in a similar sound environment, the instructions causing a processor to perform the operations of:
   receiving, at a mobile device, an input sound from a first sound environment;
   extracting, at the mobile device, a sound signature from the input sound;
   determining, at the mobile device, a reliability value of the input sound, wherein the reliability value is determined based on at least one normal sound model and at least one sensor artifact model;
   transmitting the sound signature and the reliability value from the mobile device to a server; and
   receiving, from the server, information related to at least one mobile device in a second sound environment.

17. The non-transitory computer-readable storage medium of claim 16, wherein the second sound environment is similar to the first sound environment.

18. The non-transitory computer-readable storage medium of claim 16, wherein the operations further comprise constructing a packet including a sound signature field, wherein a number of bits of the sound signature field is determined based on the reliability value, and wherein transmitting the sound signature and the reliability value includes transmitting the packet to the server.

19. The non-transitory computer-readable storage medium of claim 16, wherein the operations further comprise constructing a packet that includes a sound signature field indicative of the sound signature and a reliability field indicative of the reliability value, wherein constructing the packet includes determining a number of bits of the sound signature field based on the reliability value.

20. A method for identifying mobile devices in a similar sound environment, the method comprising:
   receiving, at a mobile device, an input sound from a first sound environment;
   extracting, at the mobile device, a sound signature from the input sound;
   determining, at the mobile device, a reliability value of the input sound based on at least one stored sound model;
   constructing a packet that includes a sound signature field indicative of the sound signature and a reliability field indicative of the reliability value, wherein constructing the packet includes determining a number of bits of the sound signature field based on the reliability value;
   transmitting the packet from the mobile device to a server; and
   receiving, from the server, information related to at least one mobile device in a second sound environment.

21. The method of claim 20, wherein the at least one stored sound model includes at least one normal sound model and at least one sensor artifact model.

22. The method of claim 20, further comprising receiving, from the server, identification information of a user of the at least one mobile device, wherein the second sound environment is similar to the first sound environment.

23. A mobile device, comprising:
   a sound sensor configured to receive an input sound from a first sound environment;
   a sound signature extracting unit configured to extract a sound signature from the input sound;
   a reliability determining unit configured to determine a reliability value of the input sound based on at least one stored sound model;
   a packet processing unit configured to construct a packet that includes a sound signature field indicative of the sound signature and a reliability field indicative of the reliability value, wherein the packet processing unit is configured to determine a number of bits of the sound signature field based on the reliability value;
   a transmitting unit configured to transmit the packet to a server; and
   a receiving unit configured to receive, from the server, information related to at least one mobile device in a second sound environment.

24. The mobile device of claim 23, wherein the at least one stored sound model includes at least one normal sound model and at least one sensor artifact model.

25. The mobile device of claim 23, wherein the information includes identification information of a user of the at least one mobile device, and wherein the second sound environment is similar to the first sound environment.

26. A mobile device, comprising:
   means for receiving an input sound from a first sound environment;
   means for extracting a sound signature from the input sound;
   means for determining a reliability value of the input sound based on at least one stored sound model;
   means for constructing a packet that includes a sound signature field indicative of the sound signature and a reliability field indicative of the reliability value, wherein the means for constructing is configured to determine a number of bits of the sound signature field based on the reliability value;
   means for transmitting the packet to a server; and
   means for receiving, from the server, information related to at least one mobile device in a second sound environment.

27. The mobile device of claim 26, wherein the at least one stored sound model includes at least one normal sound model and at least one sensor artifact model, and wherein the second sound environment is similar to the first sound environment.

28. A non-transitory computer-readable storage medium comprising instructions for identifying mobile devices in a similar sound environment, the instructions causing a processor to perform the operations of:
   receiving, at a mobile device, an input sound from a first sound environment;
   extracting, at the mobile device, a sound signature from the input sound;
   determining, at the mobile device, a reliability value of the input sound based on at least one stored sound model;
   constructing a packet that includes a sound signature field indicative of the sound signature and a reliability field indicative of the reliability value, wherein constructing the packet includes determining a number of bits of the sound signature field based on the reliability value;
   transmitting the packet from the mobile device to a server; and
   receiving, from the server, information related to at least one mobile device in a second sound environment.

29. The non-transitory computer-readable storage medium of claim 28, wherein the at least one stored sound model includes at least one normal sound model and at least one sensor artifact model, and wherein the second sound environment is similar to the first sound environment.

30. The method of claim 1, wherein the input sound corresponds to a sensor artifact sound when the input sound corresponds to at least one of a clicking of the mobile device, a tapping of the mobile device, a rubbing of the mobile device, or a vibration of the mobile device.

31. The mobile device of claim 7, wherein the input sound corresponds to a sensor artifact sound when the input sound corresponds to at least one of a clicking of the mobile device, a tapping of the mobile device, a rubbing of the mobile device, or a vibration of the mobile device.

32. The mobile device of claim 13, wherein the input sound corresponds to a sensor artifact sound when the input sound corresponds to at least one of a clicking of the means for receiving an input sound, a tapping of the means for receiving an input sound, a rubbing of the means for receiving an input sound, or a vibration of the means for receiving an input sound.

33. The non-transitory computer-readable storage medium of claim 16, wherein the input sound corresponds to a sensor artifact sound when the input sound corresponds to at least one of a clicking of the mobile device, a tapping of the mobile device, a rubbing of the mobile device, or a vibration of the mobile device.

* * * * *